(12) United States Patent
Babbar et al.

(10) Patent No.: US 8,879,584 B2
(45) Date of Patent: Nov. 4, 2014

(54) TECHNOLOGY AGNOSTIC QOS SUPPORT IN A MULTI-MODE ENVIRONMENT

(71) Applicants: Uppinder Singh Babbar, San Diego, CA (US); Idreas Mir, San Diego, CA (US); Marcello Lioy, San Diego, CA (US); Sivaramakrishna Veerepalli, San Diego, CA (US)

(72) Inventors: Uppinder Singh Babbar, San Diego, CA (US); Idreas Mir, San Diego, CA (US); Marcello Lioy, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/672,510

(22) Filed: Nov. 8, 2012

(65) Prior Publication Data

US 2013/0064084 A1 Mar. 14, 2013

Related U.S. Application Data

(62) Division of application No. 11/197,003, filed on Aug. 4, 2005, now Pat. No. 8,331,375.

(51) Int. Cl.
*H04J 1/02* (2006.01)
*H04W 28/24* (2009.01)
*H04W 36/00* (2009.01)
*H04W 84/04* (2009.01)
*H04W 28/18* (2009.01)
*H04W 4/18* (2009.01)

(52) U.S. Cl.
CPC .......... *H04W 28/24* (2013.01); *H04W 36/0044* (2013.01); *H04W 84/04* (2013.01); *H04W 28/18* (2013.01); *H04W 4/18* (2013.01)
USPC ............ 370/497; 370/349; 370/254; 370/229

(58) Field of Classification Search
USPC .................................. 370/254, 229, 488, 497
See application file for complete search history.

(56) References Cited

U.S. PATENT DOCUMENTS

| | | | |
|---|---|---|---|
| 6,366,577 | B1 | 4/2002 | Donovan |
| 6,404,738 | B1 | 6/2002 | Reininger et al. |
| H0002051 | H | 11/2002 | Zhu et al. |

(Continued)

FOREIGN PATENT DOCUMENTS

| | | |
|---|---|---|
| JP | 2004172907 | 6/2004 |
| WO | 2004034592 | 4/2004 |

OTHER PUBLICATIONS

International Search Report and Written Opinion—PCT/US2005/028200, International Search Authority—European Patent Office—Dec. 13, 2005.

(Continued)

*Primary Examiner* — Gary Mui
*Assistant Examiner* — Dewanda Samuel
(74) *Attorney, Agent, or Firm* — Kevin T. Cheatham

(57) ABSTRACT

A generic quality of service (QoS) model that is not dependent on network technology is used to support QoS for communication networks utilizing different network technologies. The generic QoS model may include a superset of all QoS parameters for all network technologies being supported, e.g., 3GPP and 3GPP2. An application at a device may specify QoS for a traffic flow based on the generic QoS parameters in the superset. The generic QoS parameters may be converted to QoS parameters that are specific to a serving network. The converted QoS parameters are exchanged with the serving network and are used while exchanging traffic with the serving network.

11 Claims, 6 Drawing Sheets

(56) References Cited

U.S. PATENT DOCUMENTS

| | | |
|---|---|---|
| 6,608,832 B2 | 8/2003 | Forslow |
| 6,631,122 B1 | 10/2003 | Arunachalam et al. |
| 6,661,780 B2 * | 12/2003 | Li .................... 370/324 |
| 6,708,034 B1 | 3/2004 | Sen et al. |
| 6,765,909 B1 * | 7/2004 | Sen et al. ............ 370/392 |
| 6,775,233 B1 | 8/2004 | Kumaran et al. |
| 6,781,972 B1 | 8/2004 | Anderlind et al. |
| 6,801,777 B2 | 10/2004 | Rusch |
| 6,970,423 B2 | 11/2005 | Chuah |
| 6,980,523 B1 * | 12/2005 | Lipford et al. ........ 370/252 |
| 7,031,718 B2 | 4/2006 | Jouppi et al. |
| 7,069,260 B2 * | 6/2006 | Yanosy .................. 706/47 |
| 7,123,910 B2 | 10/2006 | Lucidarme et al. |
| 7,206,324 B2 | 4/2007 | Persson et al. |
| 7,260,641 B2 | 8/2007 | Decker et al. |
| 7,330,448 B2 * | 2/2008 | Verma et al. ........ 370/331 |
| 7,710,873 B2 * | 5/2010 | Pulkka et al. ........ 370/235 |
| 7,995,470 B2 * | 8/2011 | Cheng et al. ........ 370/229 |
| 8,004,972 B2 * | 8/2011 | Kekki .................. 370/230 |
| 8,331,375 B2 | 12/2012 | Babbar et al. |
| 8,355,413 B2 * | 1/2013 | Vasamsetti et al. ....... 370/468 |
| 2002/0010771 A1 * | 1/2002 | Mandato .................. 709/223 |
| 2002/0039892 A1 | 4/2002 | Lindell |
| 2002/0122432 A1 | 9/2002 | Chaskar |
| 2003/0039259 A1 * | 2/2003 | Madour .................. 370/401 |
| 2003/0208582 A1 * | 11/2003 | Persson et al. ............ 709/223 |
| 2003/0210692 A1 | 11/2003 | Ramanna et al. |
| 2004/0008689 A1 * | 1/2004 | Westphal et al. ........ 370/395.21 |
| 2004/0085949 A1 * | 5/2004 | Partanen et al. ........ 370/352 |
| 2004/0121778 A1 * | 6/2004 | Hunkeler et al. ........ 455/452.2 |
| 2004/0203800 A1 | 10/2004 | Myhre et al. |
| 2004/0260750 A1 * | 12/2004 | Ruutu et al. ............ 709/200 |
| 2005/0073953 A1 * | 4/2005 | Kekki .................. 370/230 |
| 2006/0264219 A1 | 11/2006 | Satt et al. |

OTHER PUBLICATIONS

Jian; ("Supporting Quality Of Service in Multiple Heterogeneous Wireless Networks") 2002; IEEE; VTC 2002.

Siquera, et al., "Quartz: A QoS Architecture for Open Systems", 2000. Proceedings. 20th International Conference on Distributed Computing Systems, IEEE, Apr. 13, 2000, p. 197-204.

* cited by examiner

US 8,879,584 B2

TECHNOLOGY AGNOSTIC QOS SUPPORT IN A MULTI-MODE ENVIRONMENT

The present Application for Patent is a Divisional of U.S. patent application Ser. No. 11/197,003, entitled "TECHNOLOGY AGNOSTIC QOS SUPPORT IN A MULTI-MODE ENVIRONMENT," filed Aug. 4, 2005, which issued as U.S. Pat. No. 8,331,375 on Dec. 11, 2012 and which is further assigned to the assignee hereof and hereby expressly incorporated by reference herein in its entirety.

BACKGROUND

I. Field

The present disclosure relates generally to communication, and more specifically to techniques for supporting quality of service (QoS) in communication networks.

II. Background

Wireless communication networks are widely deployed to provide various communication services such as voice, packet data, and so on. These wireless networks may be multiple-access networks capable of supporting multiple users by sharing the available resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

A user may utilize a wireless device to obtain various communication services. Each service may be satisfactorily provided to the user by ensuring that a specified quality of service (QoS) is achieved for that service. QoS may be quantified by different parameters for different services. For example, a voice service may require a relatively stringent delay and a certain minimum guaranteed data rate whereas a packet data service may require a certain target packet error rate.

A wireless network typically provides the specified QoS for each service in a specific manner, e.g., using specific QoS parameters. Different wireless networks may utilize different QoS parameters for the same or comparable service. The different manners in which different wireless networks provide QoS can be problematic. For example, a wireless user may be roaming and may be handed off from one wireless network to another wireless network while receiving a packet data service. These wireless networks may provide QoS for the packet data service in different ways. The wireless device would then need to be aware of the difference in QoS support by the two wireless networks and request the appropriate QoS parameters from the new wireless network. This complicates the design of the wireless device and hinders roaming.

There is therefore a need in the art for techniques to more seamlessly support QoS across different wireless networks.

SUMMARY

Techniques for supporting QoS in communication networks utilizing different network technologies are described herein. A network technology refers to a technology or a combination of technologies used to support communication with a wireless or wireline communication network. A network technology may comprise a radio access technology (RAT), a data network technology, or a combination thereof. RAT refers to the technology used for over-the-air communication. Data network technology refers to the technology used for data transfer among network entities.

In an aspect, a generic QoS model that is not dependent on network technology is used to support QoS. The generic QoS model may comprise a superset of all QoS parameters for all network technologies being supported by a device, with redundant QoS parameters removed. An application at the device may specify QoS for a traffic flow based on the QoS parameters in the superset. The specified QoS parameters may be converted to QoS parameters that are specific to a serving network.

In an embodiment, a first set of QoS parameters for a first QoS model is received from a first entity. The first set of QoS parameters is converted to a second set of QoS parameters for a second QoS model. One or more auxiliary parameters may be defined and used for the conversion between the first and second sets of QoS parameters. The second set of QoS parameters is sent to a second entity. The first entity may be an application at the device, the second entity may be a base station (e.g., in a 3GPP or 3GPP2 network), the first QoS model may be the generic QoS model, and the second QoS model may be a network-specific QoS model (e.g., for 3GPP or 3GPP2). Alternatively, the first entity may be a base station, the second entity may be the application at the device, the first QoS model may be a network-specific QoS model, and the second QoS model may be a generic QoS model.

In another aspect, generic filter parameters that are not dependent on network technology are used for IP packet filtering. The generic filter parameters may be obtained from a superset of all filter parameters for all network technologies being supported. An application may utilize the generic filter parameters to form IP packet filters. The generic filter parameters may be converted to filter parameters that are specific to the serving network.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
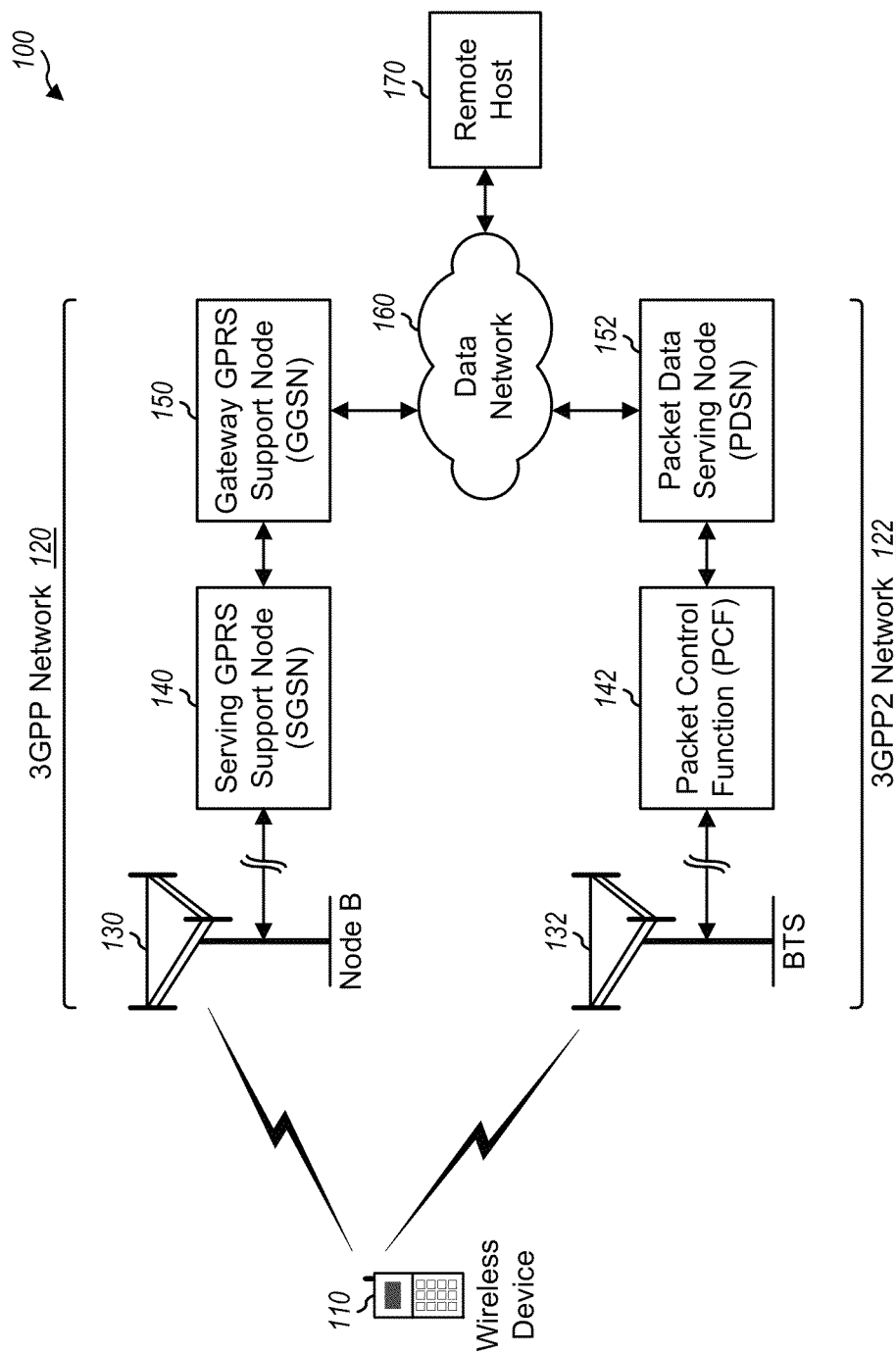
FIG. 1 shows a wireless device and two wireless networks.

FIG. 1 shows a deployment 100 in which a wireless device 110 may communicate with multiple wireless communication networks 120 and 122 utilizing different network technologies. Wireless device 110 may be a cellular phone, a personal digital assistant (PDA), a modem card, or some other wireless communication unit or device. Wireless device 110 may also be called a user equipment (UE), a mobile station (MS), a user terminal, and so on.

Wireless network 120 is a 3GPP network that may implement one or more technologies promulgated by a consortium named "3rd Generation Partnership Project" (3GPP). 3GPP network 120 may implement a RAT such as Wideband CDMA (W-CDMA), Global System for Mobile Communications (GSM), Enhanced Data rates for Global Evolution (EDGE), and so on. 3GPP network 120 may also implement a data network technology such as General Packet Radio Service (GPRS), and so on. For example, 3GPP network 120 may be a Universal Mobile Telecommunications System (UMTS) network that utilizes W-CDMA and EDGE. The various technologies promulgated by 3GPP are described in publicly available documents from 3GPP.

3GPP network 120 includes network entities described by 3GPP. Wireless device 110 may communicate with a Node B 130 via an air-link connection. For packet data service, Node B 130 communicates with a Serving GPRS Support Node (SGSN) 140, which further communicates with a Gateway GPRS Support Node (GGSN) 150. SGSN 140 controls the transmission of data packets between Node B 130 and GGSN 150. Node B 130 and SGSN 140 are parts of a 3GPP radio access network (RAN). GGSN 150 supports packet data service for the wireless devices in 3GPP network 120. GGSN 150 may couple to the Internet and/or other data networks (e.g., data network 160) and may communicate with other entities (e.g., a remote host 170) that couple to these data networks.

Wireless network 122 is a 3GPP2 network that may implement one or more technologies promulgated by a consortium named "3rd Generation Partnership Project 2" (3GPP2). 3GPP2 network 122 may implement a RAT such as IS-2000 Releases 0 and A (commonly called CDMA 1x), IS-2000 Release C (commonly called CDMA 1x EV-DV), IS-856 (commonly called CDMA 1x EV-DO), IS-95, and so on. The various technologies promulgated by 3GPP2 are commonly called cdma2000 and are described in publicly available documents from 3GPP2.

3GPP2 network 122 includes network entities described by 3GPP2. Wireless device 110 may communicate with a base transceiver station (BTS) 132 via an air-link connection. For packet data service, BTS 132 communicates with a Packet Control Function (PCF) 142, which further communicates with a Packet Data Serving Node (PDSN) 152. PCF 142 is a network entity that controls the transmission of packets between BTS 132 and PDSN 152. Base station 132 and PCF 142 are parts of a 3GPP2 RAN. PDSN 152 supports packet data service for wireless devices in the 3GPP2 network. For example, PDSN 152 is responsible for the establishment, maintenance, and termination of Point-to-Point Protocol (PPP) sessions for the wireless devices. PDSN 152 may also assign dynamic Internet Protocol (IP) addresses to the wireless devices. PDSN 152 may couple to the Internet and/or other data networks (e.g., a data network 160) and may communicate with other entities that couple to these data networks.

In general, wireless device 110 may communicate with any number of wireless networks of any network technologies. Each wireless network may be a wireless wide area network (WWAN) (e.g., a 3GPP or 3GPP2 network) or a wireless local area network (WLAN) (e.g., an IEEE 802.11 network or a Bluetooth personal area network (BTPAN)). The techniques described herein may be used for various network technologies. For clarity, these techniques are specifically described for 3GPP and 3GPP2.

Figure 2:
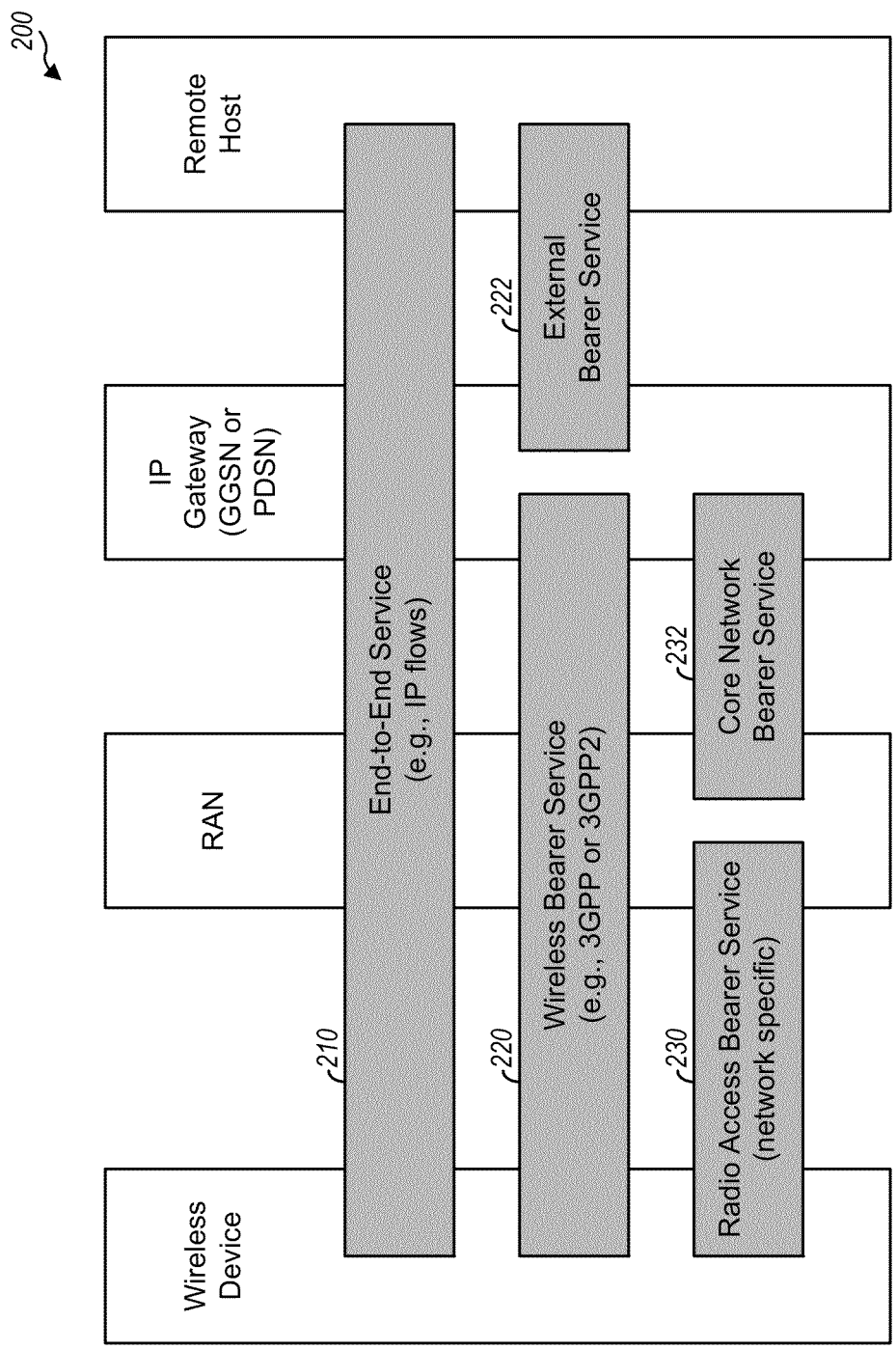
FIG. 2 shows a QoS architecture for 3GPP and 3GPP2 networks.

FIG. 2 shows a QoS architecture 200 that is generally applicable to 3GPP and 3GPP2 networks. Wireless device 110 exchanges traffic data with remote host 170 at an application level via an end-to-end service 210. End-to-end service 210 is realized by (1) a wireless bearer service 220 that is provided by wireless network 120 or 122 and (2) an external bearer service 222 that is provided by data network 160. Wireless bearer service 220 is dependent on the network technology and may be called 3GPP bearer service for 3GPP network 120 and 3GPP2 bearer service for 3GPP2 network 122. The 3GPP bearer service may provide QoS in different manners than the 3GPP2 bearer service. Wireless bearer service 220 is realized by a radio access bearer service 230 and a core network (CN) bearer service 232. Radio access bearer service 230 provides transport of traffic data and signaling between wireless device 110 and the RAN. Core network bearer service 232 controls and utilizes the backbone network in order to provide the wireless bearer service.

The QoS architecture for 3GPP is described in a document 3G TR 23.907, entitled "QoS Concept and Architecture," which is publicly available. The QoS architecture for 3GPP2 is described in a document TIA-835-D, entitled "cdma2000® Wireless IP Network Standard," which is currently a ballot document that will also be publicly available.

Wireless device 110 may exchange one or more traffic flows with remote host 170 at the application layer. These traffic flows may be IP flows or some other types of flow. Each IP flow is a stream of IP packets that matches a set of one or more IP packet filters called a traffic filter template (TFT), as described below. The traffic flows are sent via end-to-end service 210 and typically require certain QoS for satisfactory performance The 3GPP bearer service supports QoS via one set of QoS parameters. The 3GPP2 bearer service supports QoS via another set of QoS parameters. The QoS parameters may also be called QoS attributes, flow specs, and so on.

In an aspect, a generic QoS model that is not dependent on network technology is used to support QoS for communication. This generic QoS model may also be called a common QoS model, a universal QoS model, and so on. In an embodiment, the generic QoS model includes a superset or a union of all QoS parameters for all network technologies being supported. This superset may be refined by eliminating redundant QoS parameters as well as non-essential QoS parameters that may be derived from other QoS parameters. The superset may also include, without modification, QoS parameters that are specific to a given wireless network and are meaningless to other wireless networks. Each network-specific QoS parameter may be invoked and used only for the applicable wireless network.

An application may specify QoS for a traffic flow based on the QoS parameters in the superset, which are called generic QoS parameters and are not technology dependent. The generic QoS parameters may be converted to QoS parameters that are specific to a serving wireless network, which is the wireless network via which the traffic flow will be sent. The superset includes sufficient QoS parameters to allow the application to specify the desired QoS for each supported network. In general, the generic QoS model may be defined for any number of network technologies and any given network technology. The generic QoS model may be used for wireless wide area networks (WWANs), wireless local area networks (WLANs), wireline wide area networks, wireline local area networks, and so on. For clarity, the following description is for a generic QoS model for 3GPP and 3GPP2.

Table 1 lists key QoS parameters that are applicable for 3GPP and 3GPP2. Table 1 is not exhaustive, and 3GPP and 3GPP2 may define other QoS parameters that are not listed in Table 1.

TABLE 1

QoS Parameters for 3GPP and 3GPP2

| 3GPP QoS Parameter | 3GPP2 QoS Parameter |
|---|---|
| Traffic class | Traffic class |
| Maximum bit rate | Peak rate |
| Guaranteed bit rate | Token rate |
| Transfer delay | Bucket size |
| Maximum SDU size | Maximum latency |
| SDU error ratio | Maximum delay variation |
| Residual bit error ratio | Maximum allowed packet size |
| Traffic handling priority | Minimum policed packet size |
|  | Maximum loss rate |
|  | Profile ID |

In Table 1, SDU denotes service data unit, which is used interchangeably with IP packet.

Table 2 lists the generic QoS parameters for the generic QoS model. For each generic QoS parameter, an "x" in the 3GPP column indicates that this QoS parameter is applicable for 3GPP, and an "x" in the 3GPP2 column indicates that this QoS parameter is applicable for 3GPP2. Each generic QoS parameter may be applicable for one or both network technologies.

TABLE 2

Common QoS Parameters

| Parameter | Symbol | Unit | 3GPP | 3GPP2 |
|---|---|---|---|---|
| Traffic class | TC | — | x | x |
| Data rate Option 1 |  |  |  |  |
| Maximum bit rate | Rmax | bps | x |  |
| Guaranteed bit rate | Rg | bps | x |  |
| Data rate Option 2 |  |  |  |  |
| Peak rate | Rp | bps |  | x |
| Token rate | Rt | bps |  | x |
| Bucket size | B | bytes |  | x |
| Latency | L | ms | x | x |
| Latency variation | Lvar | ms |  | x |
| Maximum allowed packet size | Smax | bytes | x | x |
| Minimum policed packet size | Smin | bytes |  | x |
| Packet error rate | Eper | — | x | x |
| Residual bit error ratio | Erber | — | x |  |
| Traffic handling priority | Ptrf | — | x |  |
| Profile ID | Pid | — |  | x |

In Table 2, "bps" denotes bits per second, and "ms" denotes milliseconds.

The Traffic class (TC) parameter indicates the type of application for which the radio access bearer service is optimized. This parameter conveys certain characteristics of a traffic flow to a wireless network and helps the network set up appropriate physical channels to achieve the desired QoS for the traffic flow. 3GPP defines Conversational, Streaming, Interactive, and Background classes. 3GPP2 defines Conversational, Streaming, Interactive, Background, and Unknown classes. The main distinguishing factor among the various QoS classes is how delay sensitive the traffic is.

The Conversation class is characterized by (1) stringent and low delay (L) because of the conversational nature of the traffic and (2) a limited delay variation (low Lvar) in the traffic flow in order to preserve time relation between information entities of the traffic flow. Some exemplary applications bearing such traffic are voice and video conferencing.

The Streaming class is characterized by a limited delay variation (low Lvar) in the traffic flow in order to preserve the time relation between information entities of the traffic flow. The highest acceptable delay variation is application dependent. An exemplary application bearing such traffic is video streaming.

The Interactive class is characterized by (1) a request/response pattern of the end-user, (2) a low round trip delay (low L), and (3) preservation of payload contents (low Eper) so that packets are transparently transferred. An exemplary application bearing such traffic is web browsing.

The Background class is characterized by (1) a relatively insensitive delivery time (no specific limit on L) and (2) preservation of payload contents (low Eper). An exemplary application bearing such traffic is background email download.

The data rate parameters define the rate at which data may be sent over the wireless network. Data rate may be specified using Option 1 with rate parameters (used in 3GPP) or Option 2 with token bucket parameters (used in 3GPP2). Option 1 includes two parameters—Maximum bit rate (Rmax) and Guaranteed bit rate (Rg). Maximum bit rate is the maximum number of bits delivered by the wireless network in a given period of time. Guaranteed bit rate is the guaranteed minimum number of bits that can be delivered by the wireless network in a given period of time. For Option 2, packets (or "tokens") to be transmitted are placed in a buffer (or "token buffer") as they are generated, and packets in the buffer are sent via the wireless network. Option 2 includes three parameters—Peak rate (Rp), Bucket size (B), and Token rate (Rt). Peak rate is the maximum rate at which data may be sent when the token bucket is full. Token rate is the maximum rate at which tokens may be placed in the token bucket. Bucket size determines the maximum number of tokens that may be accumulated at any given moment. Bucket size determines the largest traffic burst size that can be handled. Option 1 more closely represents circuit switched behavior with a guaranteed fixed bandwidth over a certain time duration with no support for bursty traffic. Option 2 more closely represents packet switched behavior with support for bursty traffic.

An application may specify data rate using either Option 1 or Option 2. Regardless of which option is selected for use, all of the parameters in the selected option are specified in order to fully specify data rate. Each wireless network may support one of the options. If the option used by the application is different from the option supported by the wireless network, then the parameters for one option may be converted to the parameters for the other option as described below.

The Latency (L) parameter defines the maximum delay that can be tolerated by an IP packet during transfer through a wireless network. The delay is defined as the time when a request to transfer the IP packet is made by the wireless device to the time when the IP packet is received by the IP gateway at the wireless network, which may be GGSN 150 or PDSN 152. The Latency parameter corresponds to the Transfer delay parameter in 3GPP and the Maximum latency parameter in 3GPP2.

The Latency variation (Lvar) parameter defines the difference between the maximum and minimum delay that can be tolerated by an IP packet during transfer through a wireless network. This parameter is essentially the maximum tolerated delay jitter. This parameter is not supported by 3GPP and hence may be ignored if 3GPP network 120 is the serving network.

The Maximum allowed packet size (Smax) parameter defines the maximum packet size allowed in a traffic flow. The Maximum allowed packet size parameter corresponds to the Maximum SDU size parameter in 3GPP.

The Minimum policed packet size (5 min) parameter defines the minimum packet size that will be policed for QoS guarantees. This parameter is not supported by 3GPP and hence may be ignored if 3GPP network 120 is the serving network.

The Packet error rate (Eper) parameter defines the maximum packet error rate that can be tolerated by a traffic flow. Packet error rate is the ratio of packets received in error to total packets transmitted. In an embodiment, the Packet error rate is given by two parameters—a multiplier (m) and a negative base 10 exponent (p), or $Eper=m\times10^{-p}$. In general, the Packet error rate may be defined using a format that allows for specification of any range of values permitted by the supported network technologies. The Packet error rate parameter corresponds to the SDU error ratio parameter in 3GPP and the Maximum loss rate parameter in 3GPP2.

The Residual bit error ratio (Erber) parameter defines the undetected bit error ratio for each traffic flow in delivered packets. This parameter may be specified for each subflow of the traffic flow. However, for equal error protection, only one value may be used for all subflows. If no error detection is requested for a subflow, then the Residual bit error ratio indicates the bit error ratio for delivered packets in that subflow. This parameter is not supported by 3GPP2 and may be ignored for 3GPP2 network 122.

The Traffic handling priority (Ptrf) parameter defines the relative priority between various subflows of a traffic flow. Within 3GPP, the Traffic handling priority parameter is used for the Interactive class to differentiate between bearer qualities and to allow the wireless network to schedule traffic accordingly. Since priority is an alternative to a guarantee, these two parameter types are not used together for a single bearer. The Traffic handling priority parameter is ignored for the Conversation, Streaming, and Background classes in 3GPP. This parameter is not supported by 3GPP2 and may be ignored for 3GPP2 network 122.

3GPP defines standard sets of QoS parameter values for specific applications. Each standard set of QoS parameter values is associated with a unique Profile ID value that may be used to conveniently convey the entire set of QoS parameter values. The Profile ID parameter is supported by 3GPP2 but not 3GPP. If an application specifies a Profile ID parameter value and 3GPP2 network 122 is the serving network, then all other QoS parameters may be ignored, and the Profile ID value may be sent to 3GPP2 network 122 to request the associated standard set of QoS parameter values. To work seamlessly on networks other than 3GPP2 network 122, the application may specify the Profile ID value as well as the QoS parameters associated with that Profile ID value. Otherwise, if only the Profile ID value is specified and the serving network is not 3GPP2 network 122 (e.g., due to handoff to 3GPP network 120), then it may not be possible to derive pertinent QoS parameter values for the 3GPP network based on the Profile ID value.

Figure 3:
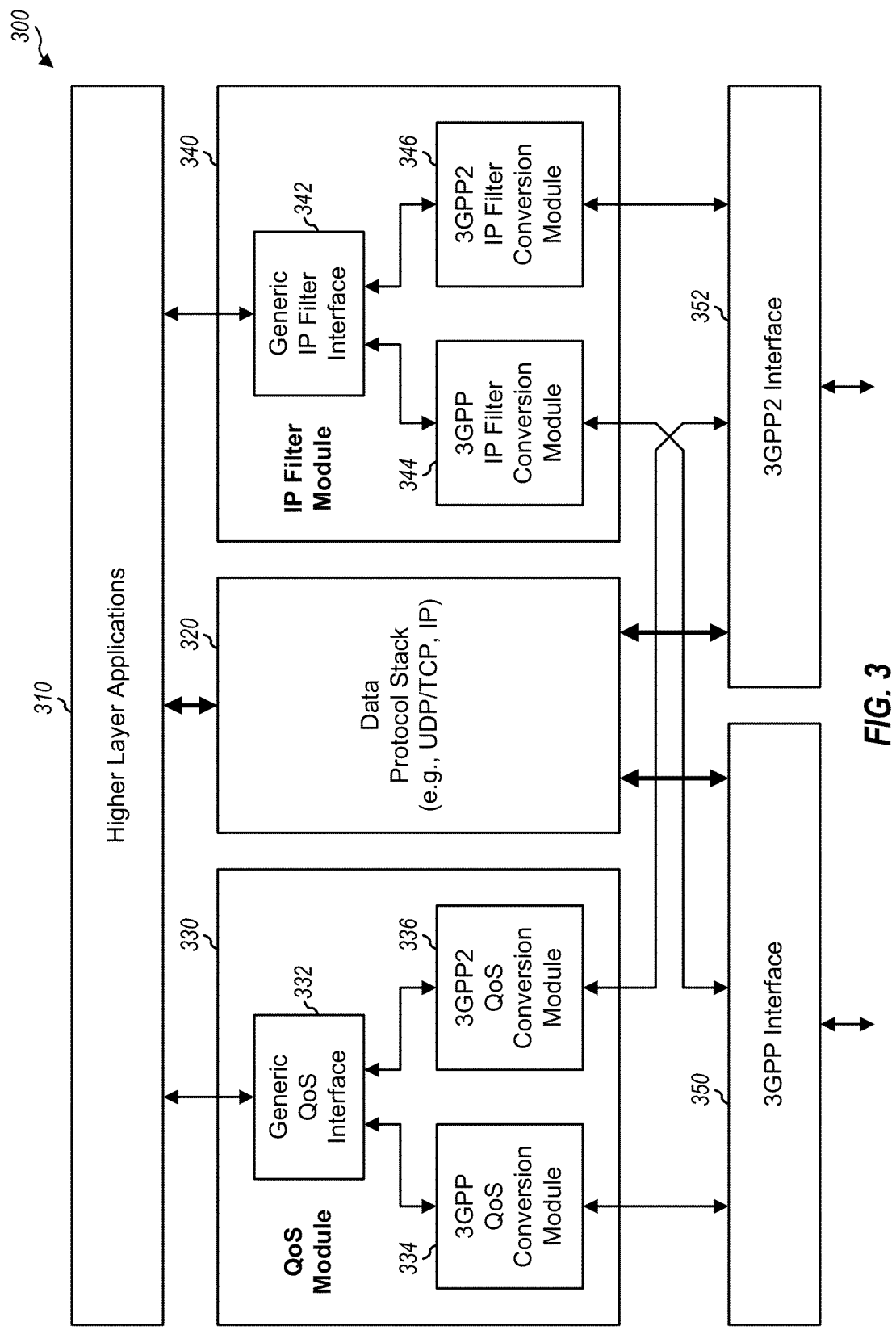
FIG. 3 shows an exemplary protocol stack within the wireless device.

FIG. 3 shows an exemplary protocol stack 300 for wireless device 110. Higher layer applications 310 execute over a data protocol stack 320, which may utilize User Datagram Protocol (UDP) and/or Transmission Control Protocol (TCP) operating on top of IP. In general, a data protocol stack may implement any combination of protocols for any number of layers. Wireless device 110 communicates with 3GPP network 120 via a 3GPP interface 350 and communicates with 3GPP2 network 122 via a 3GPP2 interface 352.

A QoS module 330 provides a generic QoS interface for applications 310, a 3GPP QoS interface for 3GPP network 120, and a 3GPP2 QoS interface for 3GPP2 network 122. QoS module 330 performs conversion (1) between the generic QoS interface and the 3GPP QoS interface and (2) between the generic QoS interface and the 3GPP2 QoS interface. QoS module 330 also performs other functions to support QoS.

Within QoS module 330, a generic QoS interface 332 provides an interface via which applications 310 can specify QoS for traffic flows using generic QoS parameters. If wireless device 110 is communicating with 3GPP network 120, then a 3GPP QoS conversion module 334 performs conversion between the generic QoS parameters and the 3GPP QoS parameters. 3GPP interface 350 exchanges the 3GPP QoS parameters with 3GPP network 120. Similarly, if wireless device 110 is communicating with 3GPP2 network 122, then a 3GPP2 QoS conversion module 336 performs conversion between the generic QoS parameters and the 3GPP2 QoS parameters. 3GPP2 interface 352 exchanges the 3GPP2 QoS parameters with 3GPP2 network 122. For QoS requests, conversion modules 334 and 336 convert generic QoS parameters to network-specific QoS parameters for transmission to the wireless networks. Conversion modules 334 and 336 also convert the granted network-specific QoS parameters back to the generic QoS parameters in the format used by the requesting applications.

As shown in FIG. 3, applications 310 can specify the desired QoS for traffic flows using the generic QoS parameters and do not need to be aware of the QoS parameters that are specific to 3GPP and 3GPP2. 3GPP network 120 can exchange 3GPP QoS parameters with wireless device 110 even though applications 310 use generic QoS parameters. Similarly, 3GPP2 network 122 can exchange 3GPP2 QoS parameters with wireless device 110 even though applications 310 use generic QoS parameters.

Auxiliary parameters may be defined to facilitate the conversion between the generic, 3GPP, and 3GPP2 QoS parameters. These auxiliary parameters include Rate dependent latency (Lr), Constant latency factor (K), Minimum data rate (Rt_min), and Maximum channel rate (C), which are described below.

For the transmit direction, a packet sent from wireless device 110 to an IP gateway (e.g., GGSN 150 or PDSN 152) typically encounters the following delays:

queuing delay at the wireless device,
propagation delay for over-the-air transmission,
queuing delay in the RAN,
transmission delay within the RAN and to the IP gateway, and
processing delay at the wireless device and the IP gateway.

For the receive direction, a packet sent from the IP gateway to wireless device 110 typically encounters the following delays:

queuing delay at the IP gateway,
transmission delay from the IP gateway to the RAN,
queuing delay in the RAN,
propagation delay for over-the-air transmission, and
processing delay at the IP gateway and the wireless device.

The different delays in each direction may be determined via computer simulation, lab testing, field measurements, and so on. The expected largest values may be used for each delay in each direction.

The Rate dependent latency (Lr) parameter approximates the total delay resulting from buffering and sending packets at a specific data rate. For the transmit direction, the Rate dependent latency may be given as:

$$\text{Lr\_tx} = \text{Queuing delay at wireless device} + \qquad \text{Eq (1a)}$$
$$\text{Transmission delay} + \text{Queuing delay at } RAN.$$

For the receive direction, the Rate dependent latency may be given as:

$$\text{Lr\_rx} = \text{Queuing delay at } IP \text{ gateway} + \qquad \text{Eq (1b)}$$
$$\text{Transmission delay} + \text{Queuing delay at } RAN.$$

If the data rate available at a given time instant in a given direction is the Token rate (Rt), then the Rate dependent latency (Lr) at that time instant for that direction may be given as:

$$Lr = B/Rt, \qquad \text{Eq (2)}$$

where B is the bucket size for that direction. The Lr value for each direction is dependent on the Rt and B values for that direction. The Lr value for the transmit direction may be the same as or different from the Lr value for the receive direction.

The Constant latency factor (K) parameter approximates the constant delay for a traffic flow. The Constant latency factor (K) for each direction may be given as:

$$K = \text{Propagation delay} + \text{Queuing delay in } RAN + \text{Processing delay}. \qquad \text{Eq (3)}$$

Each type of delay in equation (3) may have different values for the transmit and receive directions.

The actual latency (Lact) for each direction may then be given as:

$$Lact = Lr + K. \qquad \text{Eq (4)}$$

The values of Lr and K may be different for the transmit and receive directions. Hence, the actual latency may be different for the transmit and receive directions. K is network specific but is not dependent on the current data rate. If K<<L, then K may be ignored, and Lact≅Lr.

The Latency (L) parameter defines the maximum acceptable latency for an IP packet in a traffic flow. L may be derived based on one of the following:
- a latency value assigned by a wireless network based on a latency value requested by an application;
- a default latency value assigned by the wireless network, e.g., if no latency value is requested by the application;
- a default latency value associated with a traffic class specified in a QoS request; or
- a default latency value associated with the wireless network.

The wireless network may assign a latency value based on a requested latency value (if any) or a subscribed/default latency value. The default latency value may be determined based on simulations, test measurements, field measurements, and so on.

If L is the maximum tolerable latency for a traffic flow, then the maximum rate dependent latency (Lr_max), which is the maximum value of Lr, may be given as:

$$\text{Lr\_max} = L - K, \qquad \text{Eq (5)}$$
$$\cong L \text{ if } (K << L).$$

Lr_max may be used to compute the Minimum data rate (Rt_min) needed to meet the latency requirement of L, as follows:

$$\text{Rt\_min} = B/\text{Lr\_max}, \qquad \text{Eq (6)}$$
$$= B/(L - K),$$
$$\cong B/L \text{ if } (K << L).$$

Equation (6) may be used for both the transmit and receive directions since K is approximately the same in both directions. Rt_min may be different for the transmit and receive directions because L may be different for the two directions.

The Maximum channel rate (C) parameter defines the maximum channel rate for wireless device 110, which is the maximum data rate that the wireless device can support in each direction (e.g., based on hardware limitations). If an application requests a data rate that is higher than the Maximum channel rate, then the wireless device should request the Maximum channel rate from the wireless network even if the wireless network can support higher data rates.

Table 3 shows an exemplary mapping of the generic QoS parameters to 3GPP QoS parameters. If an application specifies data rate using Option 1, then the smaller of the Maximum bit rate (Rmax) and the Maximum channel rate (C) is provided as the Maximum bit rate for 3GPP. If the application specifies data rate using Option 2 and also specifies latency (or L>0), then the larger of the Minimum data rate (Rt_min) and the Peak rate (Rp), constrained by the Maximum channel rate (C), is provided as the Maximum bit rate. If the application specifies data rate using Option 2 but does not specify latency, then the smaller of the Peak rate (Rp) and the Maximum channel rate (C) is provided as the Maximum bit rate. For both Options 1 and 2, the Guaranteed bit rate (Rg) is provided as the Guaranteed bit rate for 3GPP if Rg≤C, and an error indication is provided otherwise. The other generic QoS parameters may be mapped directly (or after any necessary conversion) to the corresponding 3GPP QoS parameters.

TABLE 3

Generic QoS parameters 3GPP→ QoS parameters

| Generic QoS Parameter | 3GPP QoS Parameter |
|---|---|
| Traffic class (TC) | Traffic class |
| If Rate Option 1 specified: use MIN {Rmax, C} | Maximum bit rate |
| If Rate Option 2 specified: | |
| If (L > 0), then use MIN {MAX [Rt_min, Rp], C}, else use MIN {Rp, C} | |
| If Rg > C, then indicate Error, else use Rg | Guaranteed bit rate |
| Latency (L) | Transfer delay |
| Max allowed packet size (Smax) | Maximum SDU size |
| Packet error rate (Eper) | SDU error ratio |
| Residual bit error ratio (Erber) | Residual bit error ratio |
| Traffic handling priority (Ptrf) | Traffic handling priority |

Table 4 shows an exemplary mapping of the generic QoS parameters to 3GPP2 QoS parameters. The Peak rate for 3GPP2 is set to (1) the smaller of the Maximum bit rate (Rmax) and the Maximum channel rate (C) if Option 1 is used or (2) the smaller of the Peak rate (Rp) and the Maximum channel rate (C) if Option 2 is used. The Guaranteed bit rate (Rg) is provided as the Token rate for 3GPP2 if Rg≤C, and an error indication is provided otherwise. The Bucket size for 3GPP2 is set to (1) the smaller of the Maximum bit rate (Rmax) and the Maximum channel rate (C) times the Maximum rate dependent latency (Lr_max) if Option 1 is used or (2) the Bucket size (B) if Option 2 is used. The other generic QoS parameters may be mapped directly (or after any necessary conversion) to the corresponding 3GPP2 QoS parameters. An application may specify a Profile ID as well as the parameters associated with this Profile ID in order to operate seamlessly on networks of different network technologies. The Profile ID may be used for a network that understands this parameter. The parameters associated with the Profile ID may be used for other networks that do not understand the Profile ID.

TABLE 4

Generic QoS parameters 3GPP2 → QoS parameters

| Generic QoS Parameter | 3GPP2 QoS Parameter |
|---|---|
| Traffic class (TC) | Traffic class |
| If Rate Option 1 specified: use MIN {Rmax, C} | Peak rate |
| If Rate Option 2 specified: use MIN {Rp, C} | |
| If Rg > C, then indicate Error, else use Rg | Token rate |
| If Rate Option 1 specified: use MIN {Rmax, C} × Lr_max | Bucket size |
| If Rate Option 2 specified: use Bucket size (B) | |
| Latency (L) | Maximum latency |
| Latency variation (Lvar) | Maximum delay variation |
| Max allowed packet size (Smax) | Maximum packet size |
| Packet error rate (Eper) | Maximum loss rate |
| Profile ID (Pid) | Profile ID |

An application may query for the QoS parameters that are currently applied for a traffic flow. QoS module 330 in FIG. 3 receives the QoS parameters granted by a wireless network in the format used by that wireless network. The granted QoS parameters may be converted to the generic QoS parameters in the format used previously by the application. For example, if the application has requested data rate using Option 1, then the granted QoS parameters may be converted to the generic QoS parameters for Option 1, even if the wireless network may grant data rate using Option 2. The converted generic QoS parameters in the desired format are then returned to the application.

Table 5 shows an exemplary mapping of the 3GPP QoS parameters (column 1) to the generic QoS parameters (column 3). The generic Bucket size (B) is equal to the Maximum bit rate in 3GPP times the Maximum rate dependent latency (Lr_max). The other 3GPP QoS parameters may be mapped directly (or after any necessary conversion) to the corresponding generic QoS parameters. The generic QoS parameters that are not set by 3GPP QoS parameters are indicated as "Not Set" in column 1.

Table 5 also shows an exemplary mapping of the 3GPP2 QoS parameters (column 2) to the generic QoS parameters (column 3). The generic Maximum bit rate (Rmax) is equal to the larger of the Peak rate in 3GPP2 and the Bucket size in 3GPP2 divided by the Maximum rate dependent latency (Lr_max). The other 3GPP2 QoS parameters may be mapped directly (or after any necessary conversion) to the corresponding generic QoS parameters. The generic QoS parameters that are not set by 3GPP2 QoS parameters are indicated as "Not Set" in column 2.

TABLE 5

3GPP and 3GPP2 QoS parameters → Generic QoS parameters

| 3GPP QoS Parameter | 3GPP2 QoS Parameter | Generic QoS Parameter |
|---|---|---|
| Traffic class | Traffic class | Traffic class (TC) |
| Maximum bit rate | MAX {Peak rate, Bucket size/Lr_max} | Maximum bit rate (Rmax) |
| Guaranteed bit rate | Token rate | Guaranteed bit rate (Rg) |
| Maximum bit rate | Peak rate | Peak rate (Rp) |
| Guaranteed bit Rate | Token rate | Token rate (Rt) |
| Maximum bit rate × Lr_max | Bucket size | Bucket size (B) |
| Transfer Delay | Maximum latency | Latency (L) |
| Not Set | Maximum delay variation | Latency variation (Lvar) |
| Maximum SDU size | Maximum packet size | Max allowed packet size (Smax) |
| Not Set | Not Set | Min policed packet size (Smin) |
| Derive from SDU error ratio | Derive from Maximum loss rate | Packet error rate (Eper) |
| Residual bit error ratio | Not Set | Residual bit error ratio (Erber) |
| Traffic handling priority | Not Set | Traffic handling priority (Ptrf) |
| Not Set | Profile ID | Profile ID (Pid) |

For a QoS request, the generic QoS parameters requested by the application may be converted to network-specific QoS parameters, and the wireless network may grant these network-specific QoS parameters without any modifications. In this case, if the application queries for the granted QoS parameters, then the generic QoS parameters originally requested by the application may be returned to the application, without having to convert the granted network-specific QoS parameters back to the generic QoS parameters.

Figure 4:
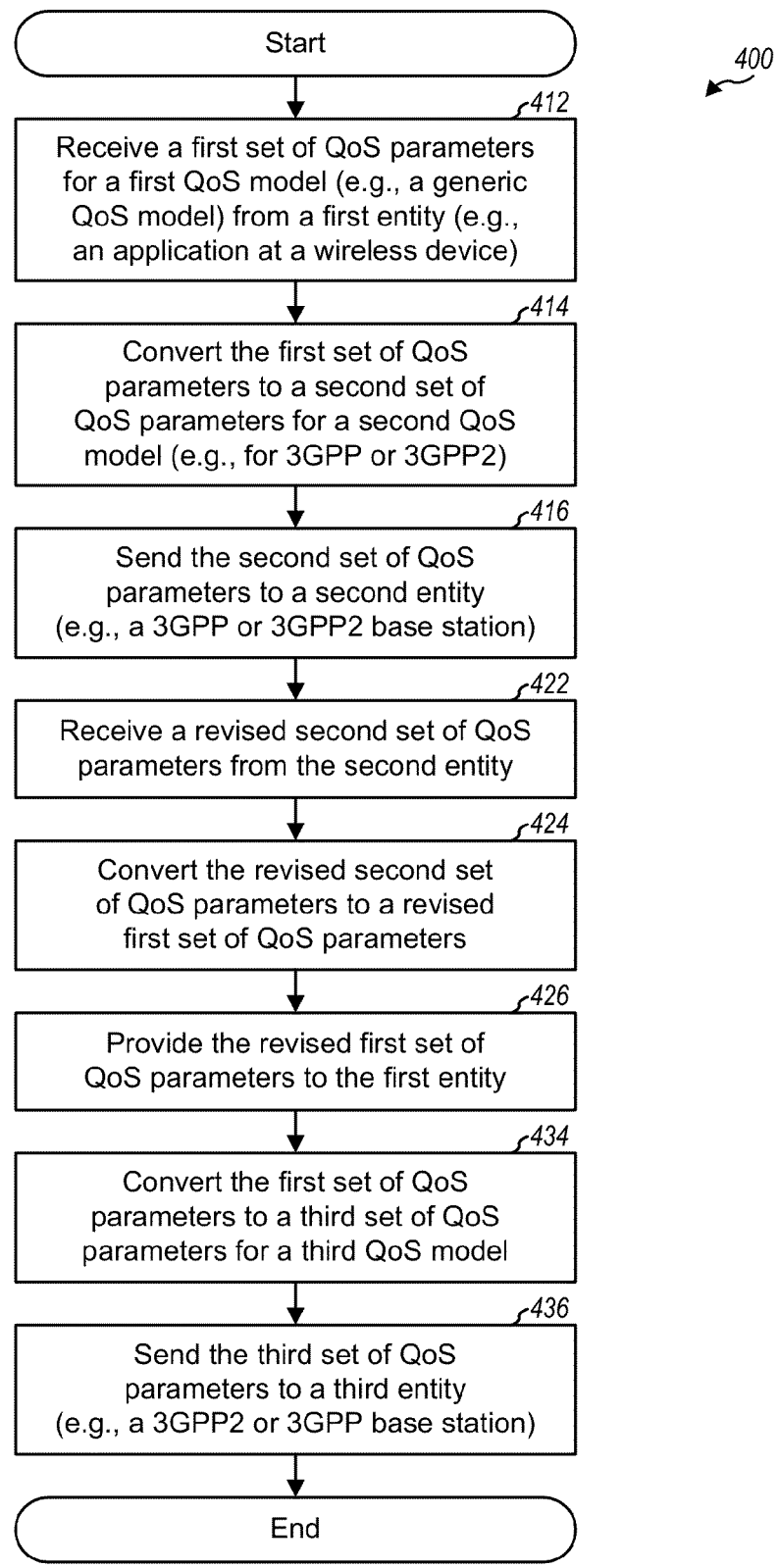
FIG. 4 shows an embodiment for supporting QoS for wireless communication.

FIG. 4 shows a process 400 for supporting QoS for communication. A first set of QoS parameters for a first QoS model is received from a first entity (block 412). The first set of QoS parameters is converted to a second set of QoS parameters for a second QoS model (block 414). One or more auxiliary parameters (e.g., Lr_max, K, Rt_min, and so on) may be defined and used for the conversion between the first and second sets of QoS parameters, as described above. The second set of QoS parameters is sent to a second entity (block 416).

The first entity may be an application at a wireless device, the second entity may be a base station (e.g., in a 3GPP or 3GPP2 network), the first QoS model may be a generic QoS model, and the second QoS model may be a network-specific QoS model (e.g., for 3GPP or 3GPP2, as indicated in FIG. 4). Alternatively, the first entity may be a base station (e.g., in a 3GPP or 3GPP2 network), the second entity may be an application at a wireless device, the first QoS model may be a network-specific QoS model (e.g., for 3GPP or 3GPP2), and the second QoS model may be a generic QoS model.

A revised second set of QoS parameters for the second QoS model may be received from the second entity (block 422). The revised second set of QoS parameters may be converted to a revised first set of QoS parameters for the first QoS model (block 424). The revised first set of QoS parameters may be provided to the first entity (block 426). Blocks 412, 414, and 416 may be performed for a QoS request. Blocks 422, 424, and 426 may be performed to report a QoS grant.

The first set of QoS parameters may be converted to a third set of QoS parameters for a third QoS model (block 434). The third set of QoS parameters may be sent to a third entity (block 436). The second and third sets of QoS models may be network-specific QoS models for different network technologies (e.g., 3GPP and 3GPP2), and the second and third entities may be base stations in different wireless networks. Blocks 434 and 436 may be performed, e.g., if the wireless device roams to another wireless network of different network technology.

Figure 5:
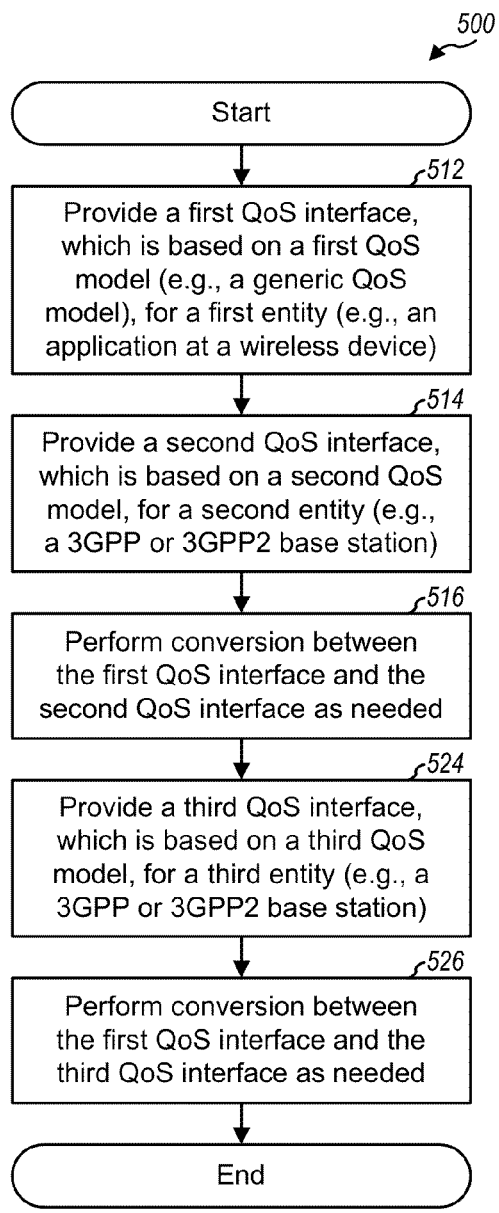
FIG. 5 shows another embodiment for supporting QoS.

FIG. 5 shows a process 500 for supporting QoS for communication. A first QoS interface that is based on a first QoS model (e.g., a generic QoS model) is provided for a first entity (e.g., an application at a wireless device) (block 512). A second QoS interface that is based on a second QoS model (e.g., a network-specific QoS model) is provided for a second entity (e.g., a 3GPP or 3GPP2 base station) (block 514). Conversion between the first QoS interface and the second QoS interface is performed as needed (block 516). A third QoS interface that is based on a third QoS model (e.g., another network-specific QoS model) is provided for a third entity (e.g., a 3GPP or 3GPP2 base station) (block 524). Conversion between the first QoS interface and the third QoS interface is performed as needed (block 526). Other processing besides QoS parameter conversion may also be performed to support QoS. For example, network-specific QoS-related events may be converted to the generic QoS model prior to being reported to the application at the wireless device.

One or more traffic flows may be exchanged between wireless device 110 and wireless network 120 or 122. The QoS for each traffic flow (or each subflow of a traffic flow) may be defined based on the generic QoS parameters, as described above. Different levels of QoS may be applied to different traffic flows and/or subflows to achieve the desired performance.

A traffic flow may carry one or more IP flows, where each IP flow is a stream of IP packets. Each IP flow may be defined by (and associated with) a set of one or more IP packet filters that is called a traffic filter template (TFT). An IP packet filter is formed by one or more filter parameters for one or more fields of an IP header and/or one or more fields of a higher layer header (e.g., a TCP or UDP header). An IP packet matches an IP packet filter if the applicable fields of that IP packet conform to the filter parameters for that IP packet filter. On the transmit direction, outbound IP packets from higher layer applications are filtered with IP packet filters to segregate these IP packets into the appropriate IP flows, which are thereafter sent at the specified QoS to the serving network. On the receive direction, inbound IP packets from the serving network are filtered with IP packet filters to segregate the inbound IP packets into the appropriate IP flows, which are thereafter sent at the specified QoS to the wireless device.

3GPP specifies a set of filter parameters that may be used for IP packet filtering. Similarly, 3GPP2 specifies another set of filter parameters that may be used for IP packet filtering. The filter parameters for 3GPP are not exactly the same as the filter parameters for 3GPP2. Hence, an application may need to be aware of the serving network in order to properly specify IP packet filters.

In another aspect, generic filter parameters that are not dependent on network technology are used to support IP packet filtering. In an embodiment, the generic filter parameters are obtained from a superset of all filter parameters for all network technologies being supported. This superset may be refined by eliminating redundant filter parameters. An application may utilize the generic filter parameters to form IP packet filters. The generic filter parameters used by the application may be converted (if needed) to filter parameters that are specific to the serving network (e.g., 3GPP or 3GPP2). The superset includes sufficient filter parameters to allow the application to specify the desired IP packet filters for each supported wireless network. In general, the generic filter parameters may be defined for any number of network technologies and any given network technology. For clarity, the following description is for generic filter parameters for 3GPP and 3GPP2.

Table 6 lists exemplary generic filter parameters, 3GPP filter parameters, and 3GPP2 filter parameters. Table 6 also shows the mapping (1) between the generic filter parameters and 3GPP filter parameters and (2) between the generic filter parameters and 3GPP2 filter parameters.

TABLE 6

| Filter parameters | | |
|---|---|---|
| Generic Filter Parameter | 3GPP Filter Parameter | 3GPP2 Filter Parameter |
| IPv4 source address | Source address | IPv4 source address |
| IPv4 source subnet mask | Subnet mask | Subnet mask |
| IPv4 destination address | | IPv4 destination address |
| IPv4 destination subnet mask | | |
| IPv4 type of service value | IPv4 type of service value | IPv4 type of service value |
| IPv4 type of service mask | IPv4 type of service mask | |
| IPv6 source address | Source address | IPv6 source address |
| IPv6 source prefix length | Subnet mask | |
| IPv6 destination address | | IPv6 destination address |
| IPv6 destination prefix length | | |
| IPv6 traffic class value | IPv6 traffic class value | IPv6 traffic class value |
| IPv6 traffic class mask | IPv6 traffic class mask | |
| IPv6 flow label | IPv6 flow label | IPv6 flow label |
| Next header protocol | Protocol number/ Next header | Protocol/Next header |
| TCP source port | | Source port |
| TCP source port range | Source port range | Source port range |
| TCP destination port | | Destination port |
| TCP destination port range | Destination port range | Destination port range |
| UDP source port | | Source port |
| UDP source port range | Source port range | Source port range |
| UDP destination port | | Destination port |
| UDP destination port range | Destination port range | Destination port range |
| ICMP message type | | |
| ICMP message code | | |
| IPSec security parameter index (SPI) | IPSec security parameter index (SPI) | IPSec security parameter index (SPI) |

Referring back to FIG. 3, an IP filter module 340 includes a generic IP filter interface 342, a 3GPP IP filter conversion module 344, and a 3GPP2 IP filter conversion module 346. Generic IP filter interface 342 provides an interface via which applications 310 can specify the desired IP packet filters using generic filter parameters. If wireless device 110 is communicating with 3GPP network 120, then 3GPP IP filter conversion module 344 performs conversion between the generic filter parameters and the 3GPP filter parameters to generate 3GPP IP packet filters, which are applied on IP packets exchanged via 3GPP interface 350. Similarly, if wireless device 110 is communicating with 3GPP2 network 122, then 3GPP2 IP filter conversion module 346 performs conversion between the generic filter parameters and the 3GPP2 filter parameters to generate 3GPP2 IP packet filters, which are applied on IP packets exchanged via 3GPP2 interface 352.

Figure 6:
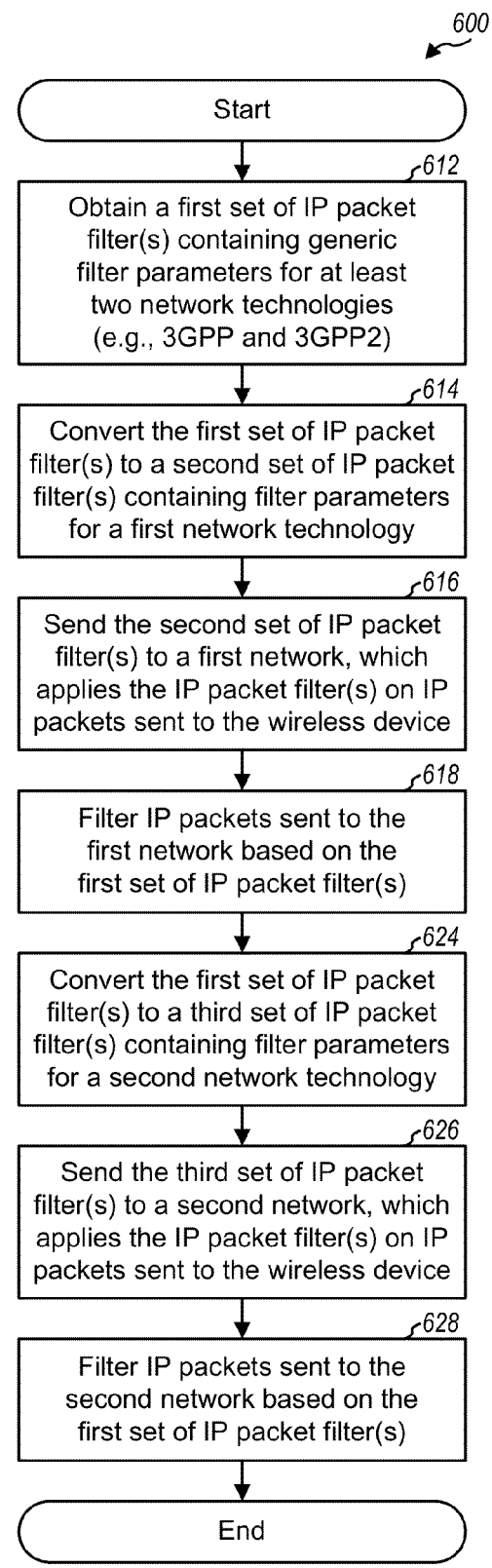
FIG. 6 shows an embodiment for performing IP packet filtering.

FIG. 6 shows a process 600 for performing IP packet filtering. A first set of at least one IP packet filter is obtained, e.g., from an application at a wireless device (block 612). The first set of at least one IP packet filter is defined based on a first set of filter parameters (e.g., generic filter parameters), which may be defined for one or more network technologies (e.g., 3GPP and 3GPP2). The first set of at least one IP packet filter is converted to a second set of at least one IP packet filter, which is defined based on a second set of filter parameters for a first network technology (e.g., 3GPP or 3GPP2) (block 614).

IP packets exchanged with a first network (e.g., a 3GPP or 3GPP2 network) are filtered based on the first and/or second sets of at least one IP packet filter. The wireless device may send the second set of at least one IP packet filter to the first network, which may apply the IP packet filter(s) on IP packets sent to the wireless device (block 616). The wireless device may apply the first set of at least one IP packet filter on IP packets sent to the first network (block 618).

The first set of at least one IP packet filter may be converted to a third set of at least one IP packet filter, which is defined based on a third set of filter parameters for a second network technology (block 624). IP packets exchanged with a second network are filtered based on the first and/or third sets of at least one IP packet filter. The wireless device may send the third set of at least one IP packet filter to the second network, which may apply the IP packet filter(s) on IP packets sent to the wireless device (block 626). The wireless device may apply the first set of at least one IP packet filter on IP packets sent to the second network (block 628).

The generic QoS parameters and the generic filter parameters described herein provide various advantages. An application may specify QoS and IP packet filters using the generic QoS parameters and the generic filter parameters, respectively. The application does not need to be aware of the technology used by the serving network. This capability supports seamless roaming among networks of different technologies since the generic QoS and filter parameters specified by the application may be converted to network-specific QoS and filter parameters, if and as needed. This conversion may be transparent to the application. The use of generic QoS and filter parameters provides more intuitive, stable, and extensible application programming interface (API) and also allows for development of applications that are not network specific. Such applications may be advantageously used, e.g., in a multi-mode wireless device that supports multiple network technologies (e.g., 3GPP and 3GPP2).

Figure 7:
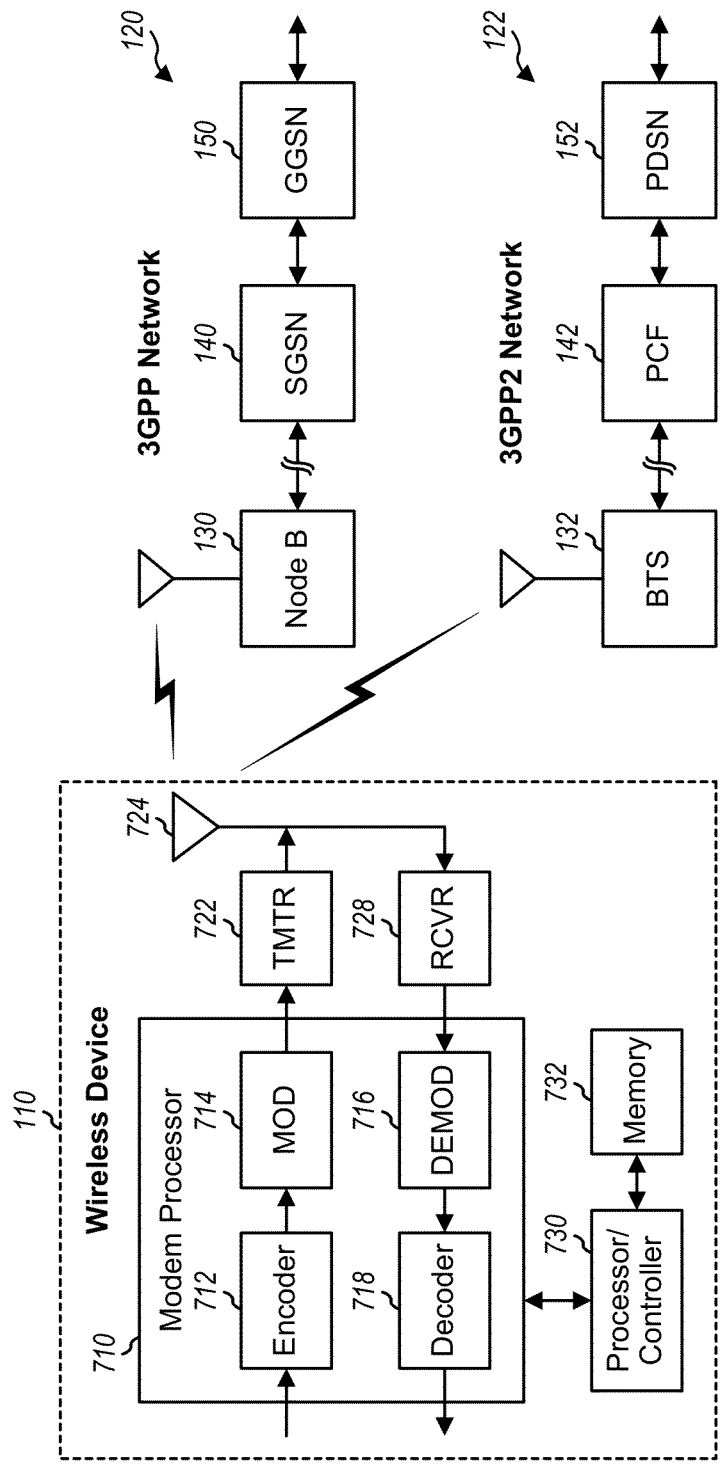
FIG. 7 shows a block diagram of the wireless device.

FIG. 7 shows a block diagram of wireless device 110. On the transmit path, data and signaling to be sent by wireless device 110 are processed (e.g., formatted, encoded, and interleaved) by an encoder 712 and further processed (e.g., modulated, spread, channelized, and scrambled) by a modulator (MOD) 714 to obtain a stream of data chips. A transmitter unit (TMTR) 722 then conditions (e.g., converts to analog, filters, amplifies, and frequency upconverts) the data chip stream to generate an uplink signal, which is transmitted via an antenna 724. On the receive path, downlink signals transmitted by base stations in 3GPP network 120 and/or 3GPP2 network 122 are received by antenna 724 and provided to a receiver unit (RCVR) 728. Receiver unit 728 conditions (e.g., filters, amplifies, and frequency downconverts) the received signal and further digitizes the conditioned signal to obtain data samples. A demodulator (DEMOD) 716 processes (e.g., descrambles, despreads, channelizes, and demodulates) the data samples to obtain symbols. A decoder 718 further processes (e.g., deinterleaves and decodes) the symbols to obtain decoded data. Encoder 712, modulator 714, demodulator 716, and decoder 718 may be implemented by a modem processor 710. These units perform processing in accordance with the network technology (e.g., 3GPP or 3GPP2) used by the serving network.

A processor/controller 730 directs the operation of various units within wireless device 110. Processor/controller 730 may implement processes 400, 500 and/or 600 in FIGS. 4, 5 and 6, respectively. A memory unit 732 stores program codes and data used by processor/controller 730 and other units. Memory unit 732 may store the pertinent QoS parameters and IP packet filters.

The techniques described herein may be implemented by various means. For example, these techniques may be implemented in hardware, software, or a combination thereof. For a hardware implementation, the processing units used to support QoS and IP packet filtering may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 732 in FIG. 7) and executed by a processor (e.g., processor 730). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing Internet Protocol (IP) packet filtering, comprising:
    obtaining at a device a first set of at least one IP packet filter defined based on a first set of filter parameters for at least two network technologies;
    converting the first set of at least one IP packet filter to a second set of at least one IP packet filter, the second set of at least one IP packet filter being defined based on a second set of filter parameters for a first network technology among the at least two network technologies;
    sending the second set of at least one IP packet filter to a first network;
    converting the first set of at least one IP packet filter to a third set of at least one IP packet filter, the third set of at least one IP packet filter being defined based on a third set of filter parameters for a second network technology among the at least two network technologies;
    sending the third set of at least one IP packet filter to a second network; and
    filtering IP packets sent to the second network based on the first set of at least one IP packet filter.

2. The method of claim 1, further comprising:
    filtering IP packets sent to the first network based on the first set of at least one IP packet filter.

3. The method of claim 1, wherein the first set of at least one IP packet filter is obtained from an application at the device.

4. The method of claim 1, wherein the first set of filter parameters is a superset of filter parameters used by the at least two network technologies.

5. An apparatus comprising:
a processor operative to obtain a first set of at least one Internet Protocol (IP) packet filter, to convert the first set of at least one IP packet filter to a second set of at least one IP packet filter, to send the second set of at least one IP packet filter to a first network, to convert the first set of at least one IP packet filter to a third set of at least one IP packet filter, to send the third set of at least one IP packet filter to a second network, and to filter IP packets sent to the second network based on the first set of at least one IP packet filter, wherein the first set of at least one IP packet filter is defined based on a first set of filter parameters for at least two network technologies, wherein the second set of at least one IP packet filter is defined based on a second set of filter parameters for a first network technology among the at least two network technologies, and wherein the third set of at least one IP packet filter being defined based on a third set of filter parameters for a second network technology among the at least two network technologies; and
a memory unit operative to store the first set of at least one IP packet filter, the second set of at least one IP packet filter, or both the first and second sets of at least one IP packet filter.

6. The apparatus of claim 5, wherein the processor is operative to filter IP packets sent to the first network based on the first set of at least one IP packet filter.

7. The apparatus of claim 5, wherein the at least two network technologies comprise 3GPP and 3GPP2.

8. An apparatus comprising:
means for obtaining a first set of at least one Internet Protocol (IP) packet filter defined based on a first set of filter parameters for at least two network technologies;
means for converting the first set of at least one IP packet filter to a second set of at least one IP packet filter, the second set of at least one IP packet filter being defined based on a second set of filter parameters for a first network technology among the at least two network technologies;
means for sending the second set of at least one IP packet filter to a first network;
means for converting the first set of at least one IP packet filter to a third set of at least one IP packet filter, the third set of at least one IP packet filter being defined based on a third set of filter parameters for a second network technology among the at least two network technologies;
means for sending the third set of at least one IP packet filter to a second network; and
means for filtering IP packets sent to the second network based on the first set of at least one IP packet filter.

9. The apparatus of claim 8, further comprising:
means for filtering IP packets sent to the first network based on the first set of at least one IP packet filter.

10. A non-transitory computer readable media for storing instructions executed by a processor in a device, operable to perform:
obtain a first set of at least one Internet Protocol (IP) packet filter defined based on a first set of filter parameters for at least two network technologies;
convert the first set of at least one IP packet filter to a second set of at least one IP packet filter, the second set of at least one IP packet filter being defined based on a second set of filter parameters for a first network technology among the at least two network technologies;
send the second set of at least one IP packet filter to a first network;
convert the first set of at least one IP packet filter to a third set of at least one IP packet filter, the third set of at least one IP packet filter being defined based on a third set of filter parameters for a second network technology among the at least two network technologies;
send the third set of at least one IP packet filter to a second network; and
filter IP packets sent to the second network based on the first set of at least one IP packet filter.

11. The processor readable media of claim 10 and further for storing instructions operable to:
filter IP packets sent to the first network based on the first set of at least one IP packet filter.

* * * * *